Figure 1:
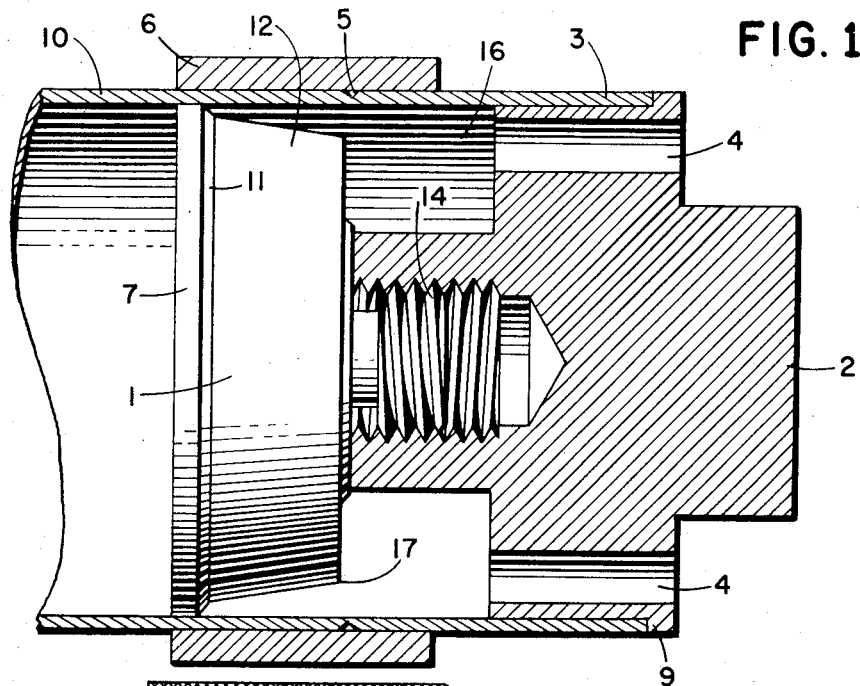

United States Patent
Grin et al.

[15] 3,699,297
[45] Oct. 17, 1972

[54] A CENTERING PLUG FOR MAGNETIC WELDING A PLUG IN THE END OF A TUBE

[72] Inventors: Michel Grin, Varese; Francois Marchal, Cadrezzate, both of Italy

[73] Assignee: European Atomic Energy Community (Euratom), Kirchberg, Luxembourg

[22] Filed: June 10, 1971

[21] Appl. No.: 151,975

Related U.S. Application Data

[62] Division of Ser. No. 95,317, Dec. 4, 1970, Pat. No. 3,627,980.

[52] U.S. Cl. .................. 219/9.5, 219/152, 219/160, 269/52
[51] Int. Cl. .................................................. B21j 5/08
[58] Field of Search........219/9.5, 7.5, 152, 158, 160, 219/161; 269/47, 49, 52

[56] References Cited

UNITED STATES PATENTS

| | | | |
|---|---|---|---|
| 3,188,446 | 6/1965 | Ray et al.............. | 219/9.5 X |
| 3,251,974 | 5/1966 | Seyfried................. | 219/7.5 |
| 3,092,058 | 6/1963 | Feeler.................... | 269/52 |

*Primary Examiner*—J. V. Truhe
*Assistant Examiner*—B. A. Reynolds
*Attorney*—Stevens, Davis, Miller & Mosher

[57] ABSTRACT

A centering device is detachably secured to the outside surface of the plug which is to be magnewelded in the end of a tube. The assembly comprising the plug and the centering device is then inserted in the tube until the outside surface of the plug reaches a position adjacent a circumferential notch on the tube. Current is then passed through a magnewelding coil surrounding the tube. The tube contracts radically, is welded onto the plug and snaps off along the notch. It is then only necessary to detach the centering member from the plug to complete the welding operation.

3 Claims, 2 Drawing Figures

PATENTED OCT 17 1972 3,699,297

A CENTERING PLUG FOR MAGNETIC WELDING A PLUG IN THE END OF A TUBE

The present application is a division of our application Ser. No. 95,317, filed Dec. 4, 1970, now U.S. Pat. No. 3,627,980.

This invention relates to a method by which a plug can be magnewelded in a perfectly centered position inside the end of a tube. It is suitable even for very shallow plugs, which are very difficult to center for welding. The Applicants do not know of any other method by which shallow plugs can be magnewelded in a well centered position while retaining sufficient depth for a good quality weld.

The invention also relates to a very simple device for carrying out the invention, this device being reusable.

When a plug is to be magnewelded inside a tube it must firstly be correctly positioned in the tube. That is to say, it must not be askew. If the plug is shallow, it is almost impossible to position it correctly using known techniques. After this centering of the plug the magnewelding coil is put in place, and the magnewelding proper is carried out.

According to the present invention there is provided a method of magnewelding a plug inside the end of a tube which method comprises detachably securing a centering device to the outside surface of the plug, and inserting the resulting assembly into the tube until the outer end of the plug which is kept central in the tube by the centering device which engages in the tube reaches a position adjacent a circumferential weakened portion formed in the tube at the place where the tube is to end after the welding step, an electric current being then passed through a magnewelding coil which surrounds the tube at the level of the zone to be welded, and which extends beyond the weakened portion of the tube towards the end of the tube, so that the tube is welded onto the plug and snaps off along the weakened portion; the centering device being thereafter detached from the plug.

The invention further provides a reusable device for carrying out the method described above which device comprises a securing member adapted to detachably secure the device to the outside surface of the plug, the external lateral surface of the centering device being so shaped that it slides in the end of the tube with an easy fit, the device being constricted at its securing member and possessing at least one orifice for evacuating air contained in the space between the construction and the tube wall.

Figure 2:
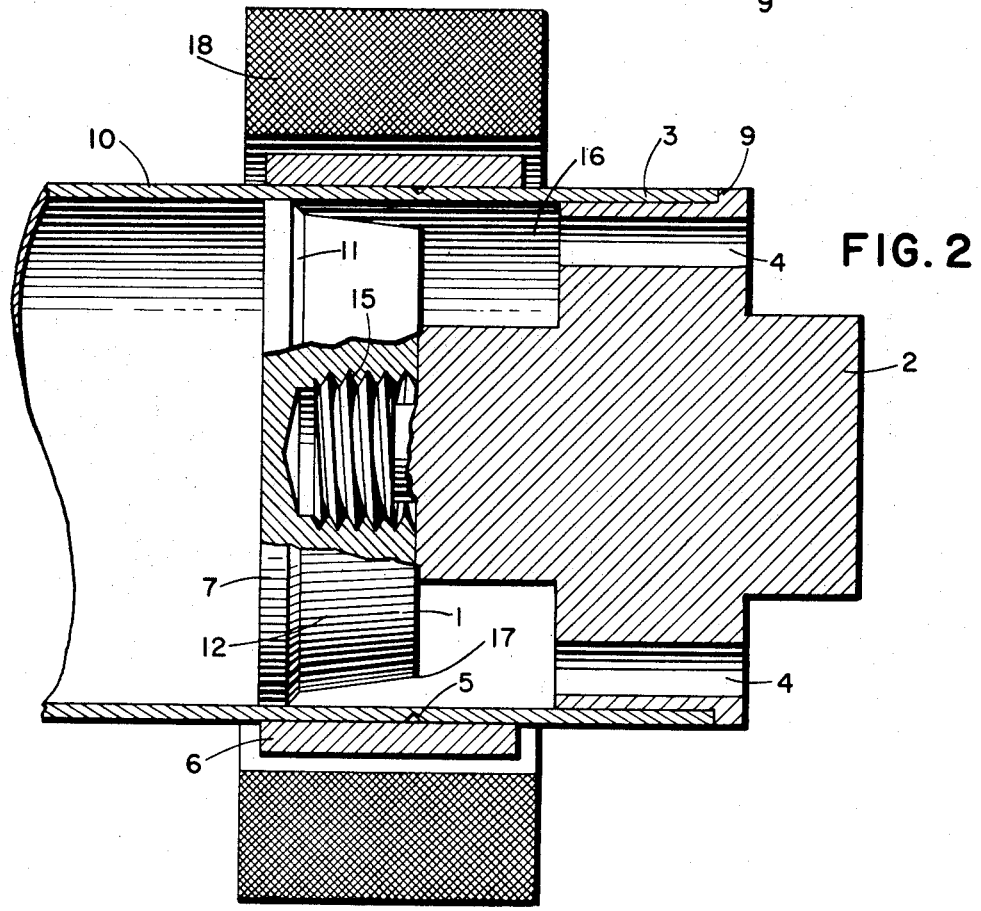

The invention will be better understood from the following description by way of example, referring to FIGS. 1 and 2 of the accompanying drawings which illustrate two variants of the device embodying the invention, shown by means of sections along planes passing through the tube axes. In the Figures like elements bear like reference numerals.

The Figures show a plug 1 which is to be magnewelded onto a tube 10. The plug 1 comprises a very shallow cylindrical portion, possibly only 1 mm in depth, and one or more frustoconical portions such as 11 and 12, whose shape depends on the magnewelding specifications. It will be clear immediately that the portion 7 is too shallow to be able to make the plug 1 coaxial with the tube by itself.

In accordance with one of the features of the invention the plug 1 is equipped, on its outside surface, with a guiding and centering element 2 whose external lateral surface 13 is so shaped that it slides in the end 3 of the tube 10 with an easy fit. This guiding element 2 is fixed to the plug 1 in a detachable manner, for example by means of a simple screw arrangement. In the variant shown in FIG. 1, the plug 1 has a threaded spigot 14 onto which the element 2 screws. In the variant shown in FIG. 2, on the other hand, the plug 1 contains a threaded hole 15 in which the element 2 screws. The element 2 is constricted in the vicinity of the plug 1, to form a space 16 into which the tube wall can bend while contracting under the influence of the magnetic pulse.

The tube 10 is also provided with a circumferential notch 5, situated exactly where the tube is to end after magnewelding, that is, on the finished article.

By choosing the correct dimensions for the element 2, which may advantageously be provided with a shoulder 9 positioned so that when the end of the tube 3 abuts on it, the plug 1 can very easily be positioned in exactly the right place for the notch 5 to come precisely at the edge 17 of the outside surface of the plug when the tube contracts under the influence of the magnetic pulse.

The plug 2 also contains orifices 4 for evacuating the air from the space 16 during the magnetic pulse.

A magnewelding coil 18 see FIG. 2, is placed around the tube 10 in a known manner. It covers all the zone occupied by the plug and extends beyond the notch 5.

The method embodying the invention consists in inserting the plug 1, to which the guiding element 2 has previously been detachably fixed, in the tube 10. The plug is inserted until the edge 17 of its outside surface reaches a position opposite the circumferential notch 5. Because the element 2 engages the tube, the plug is kept centered. Because of the suitably placed shoulder 9, correct positioning of the notch is ensured merely by pushing the plug in until the tube abuts on the shoulder. After this positioning operation, the current is passed through the coil, which surrounds the tube in the zone which is to be welded and beyond the groove. Under the influence of the magnetic field suddenly produced, the tube contracts rapidly, which causes it to be welded onto the plug along the frustoconical portions of the plug. Since the unwelded tube portion situated beyond the notch continues to contract into the space 16, the tube snaps off exactly along the notch, that is to say, precisely at the edge of the plug. The orifices 4 enable the air expelled due to contraction of the tube to escape from the space 16 to the atmosphere.

After these operations, it is necessary only to detach the element 2 from the plug and to divest the element of the end 3 of the tube 10. The element 2 is now ready for another welding operation.

It should be noted that, if the tube is a poor electrical conductor, a sleeve such as 6 of conductive material, known as a "propellant", can be inserted in a known manner between the tube and the coil.

Obviously, the invention is not restricted to the embodiment just described, but covers all variants of this embodiment. For example, without exceeding the scope of the invention, the portion serving to center the element 2 in the tube 3, instead of forming a solid cylinder containing orifices, might be in the form of radial extensions from a central portion, these extensions being equispaced around the periphery of this central portion.

Also, the invention is applicable to tubes and plugs of any cross-section.

What we claim is:

1. A reusable device for centering a plug which is to be magnewelded inside the end of a tube, said plug contacting said tube along a peripheral portion of the plug which is only a small fraction of the diameter of said plug, which device comprises a member adapted to be detachably connected to the outside surface of the plug, the external lateral surface of the centering device being so shaped and dimensioned that it slides coaxially in the end of the tube with an easy fit, at least one orifice in said member allowing escape of air contained in the space between said plug, said member, and the tube during the magnewelding when said tube is magnetically driven radially inwardly and fractures along a circumferentially weakened portion.

2. A device as claimed in claim 1, further comprising a shoulder formed on said member and adapted to abut against an end of the tube, said shoulder being so positioned that, when the tube abuts on it, a circumferential weakened portion of the tube is positioned opposite the outside surface of the plug so that, after magnewelding, the weakened portion is exactLy on the edge of the outside surface of the plug.

3. A device as claimed in claim 1, further comprising screw-threaded means for attaching said member to said plug.

* * * * *